United States Patent
Hayase et al.

(10) Patent No.: US 9,083,450 B2
(45) Date of Patent: Jul. 14, 2015

(54) BASE STATION, SYSTEM, AND METHOD OF MACRO AND PICO BASE STATION INTERFERENCE COORDINATION USING UPLINK PROHIBITION PERIOD

(71) Applicant: Hitachi, Ltd., Tokyo (JP)

(72) Inventors: Shigenori Hayase, Yokohama (JP);
Tsuyoshi Tamaki, Machida (JP);
Tomonori Yamamoto, Fujisawa (JP);
Rintaro Katayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 13/740,932

(22) Filed: Jan. 14, 2013

(65) Prior Publication Data

US 2013/0190024 A1 Jul. 25, 2013

(30) Foreign Application Priority Data

Jan. 25, 2012 (JP) ................................. 2012-013214

(51) Int. Cl.
*H04W 28/02* (2009.01)
*H04W 16/04* (2009.01)
*H04B 15/00* (2006.01)
*H04W 72/12* (2009.01)

(52) U.S. Cl.
CPC ........... *H04B 15/00* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 2010/0317339 A1 | 12/2010 | Koc | |
| 2011/0255468 A1* | 10/2011 | Vajapeyam et al. | ........... 370/328 |
| 2012/0099462 A1 | 4/2012 | Yuda et al. | |
| 2012/0135743 A1 | 5/2012 | Ebiko et al. | |

FOREIGN PATENT DOCUMENTS

| | | |
|---|---|---|
| JP | 2006-217415 A | 8/2006 |
| WO | WO 2010/143445 A1 | 12/2010 |
| WO | WO 2011/021388 A1 | 2/2011 |

OTHER PUBLICATIONS

European Patent Office extended search report on application 13151276.6 mailed May 22, 2014; 8 pages.
Japan Patent Office Notification of Reasons for Refusal on application 2012-013214 dispatched Feb. 24, 2015; 1 page.

* cited by examiner

*Primary Examiner* — Philip Sobutka
(74) *Attorney, Agent, or Firm* — Foley & Lardner LLP

(57) ABSTRACT

A macro base station includes a communication prohibited period setting unit of setting an uplink communication prohibited period to a user equipment belonging to the base station, and prohibits an uplink communication from the user equipment to a wireless communication base station per se during the uplink communication prohibited period. The user equipments belonging to the wireless communication base station per se and the second base station are divided into plural groups, and the uplink communication prohibited period is set to different time periods for the respective groups. Thereby, a communication characteristic is prohibited from being deteriorated at the second base station by an interference affected with the second base station separately from the first base station by the user equipment communicating with the first base station in the uplink communication.

13 Claims, 12 Drawing Sheets

FIG. 6

|          | Group A | Group B |
|----------|---------|---------|
| Pico BS  | 120     | 130     |
|          |         | 140     |
| Macro UT | 311     | 311     |
|          | 313     | 315     |
|          | 314     |         |

FIG. 8

|  |  | Group A | Group B |  | Group |
|---|---|---|---|---|---|
|  |  | Pico BS | | | |
|  |  | 120 | 130 | 140 | |
| Macro UT | 311 | −80dBm | −95dBm | −85dBm | A, B |
| | 312 | −124dBm | −130dBm | −108dBm | − |
| | 313 | −76dBm | −135dBm | −120dBm | A |
| | 314 | −83dBm | −126dBm | −118dBm | A |
| | 315 | −135dBm | −75dBm | −69dBm | B |

FIG. 10

| Number of UT | 1 | 2 | 3 | 4 | 5 | 6 | ... |
|---|---|---|---|---|---|---|---|
| Threshold | −80dBm | −82dBm | −84dBm | −84dBm | −86dBm | −86dBm | ... |

FIG. 11

| Time | Jan.–Jun. | | Jul.–Dec. | |
|---|---|---|---|---|
| | 9:00–21:00 | 21:00–9:00 | 9:00–21:00 | 21:00–9:00 |
| Threshold | −90dBm | −84dBm | −95dBm | −84dBm |

BASE STATION, SYSTEM, AND METHOD OF MACRO AND PICO BASE STATION INTERFERENCE COORDINATION USING UPLINK PROHIBITION PERIOD

CLAIM OF PRIORITY

The present application claims priority from Japanese patent application JP 2012-013214 filed on Jan. 25, 2012, the content of which is hereby incorporated by reference into this application.

FIELD OF THE INVENTION

The present invention relates to a wireless communication base station, a wireless communication system, and an uplink interference coordination method, particularly relates to a wireless communication base station, a wireless communication system, and an uplink interference coordination method for coordinating an interference of an uplink communication.

BACKGROUND OF THE INVENTION

There is US2010/0317339A1 publication as a background art of the field of the invention. The publication describes as "The scheduler assigns a common group ID to mobile stations based on interference levels of a common interference source and allocates bandwidth within a selected zone of an OFDMA uplink subframe to the mobile stations assigned the common group ID for uplink communications within the uplink subframe".

SUMMARY OF THE INVENTION

In an uplink communication, a communication characteristic is deteriorated at a base station 2 by an interference of a user equipment communicating with a certain base station 1 which is affected to the base station 2 that is different from the base station 1. It is an object of the present application to improve a deterioration in the communication characteristic.

There is widely investigated a configuration which is referred to as HetNet (Heterogeneous Network) in order to increase a capacity of a communication system. In HetNet, there are mixedly installed base stations having different downlink transmit powers. In the following, a base station having a comparatively large downlink transmit power is referred to as a macro base station, a base station having a comparatively small downlink transmit power is referred to a pico base station, and a cover area of a base station is referred to as cell. In HetNet, a user equipment which communicates with a macro base station at a cell edge of the macro base station affects a considerable interference to a pico base station, and a communication characteristic of the pico base station is considerably deteriorated. Also, in a case where plural pico base stations are installed in a cell of a macro base station, one piece of the user equipment which communicates with the macro base station affects an interference with the plural pico base stations.

US2010/0317339A1 publication conceives a system which is configured only by a macro base station. However, US2010/0317339A1 publication does not conceive a configuration as in HetNet. Particularly, deterioration in a communication characteristic cannot be improved in a case where one piece of the user equipment affects interference with plural base stations.

In view of the above-described, it is one of objects of the present invention to provide apparatus or ways of improving deterioration in a communication characteristic by an interference also in a wireless communication system in which there are mixedly present base stations having different downlink transmit powers as in HetNet. Particularly, it is one of the objects of the present invention to improve deterioration in a wireless communication characteristic that is brought about in an uplink communication.

In order to address the problem described above, the present invention adopts a configuration described in, for example, claim(s).

The present application includes plural apparatus or ways of resolving the problem described above. When an example thereof is pointed out, the present application is featured in a wireless communication base station which communicates with a user equipment in which an uplink communication prohibited period is set to the user equipment, and an uplink communication of the user equipment is prohibited during the uplink communication prohibited period.

According to the present invention, there can be provided apparatus or ways of improving deterioration in a communication characteristic by interference even in a wireless communication system in which there are mixedly present base stations having different downlink transmit powers as in HetNet. Particularly, according to the present invention, there can be improved a deterioration in a wireless communication characteristic which is brought about in an uplink communication.

BRIEF DESCRIPTION OF THE DRAWINGS

FIG. 6 is a diagram showing a configuration of a group according to configuration example 2;

FIG. 8 is a diagram showing a group dividing method according to configuration example 3;

FIG. 10 is a table used in setting a threshold according to configuration example 7;

FIG. 11 is a table used for setting a threshold according to configuration example 8;

DETAILED DESCRIPTION OF THE PREFERRED EMBODIMENTS

An explanation will be given of a configuration example in reference to the drawings as follows:

1. First Embodiment (Configuration Example 1)

Figure 2:
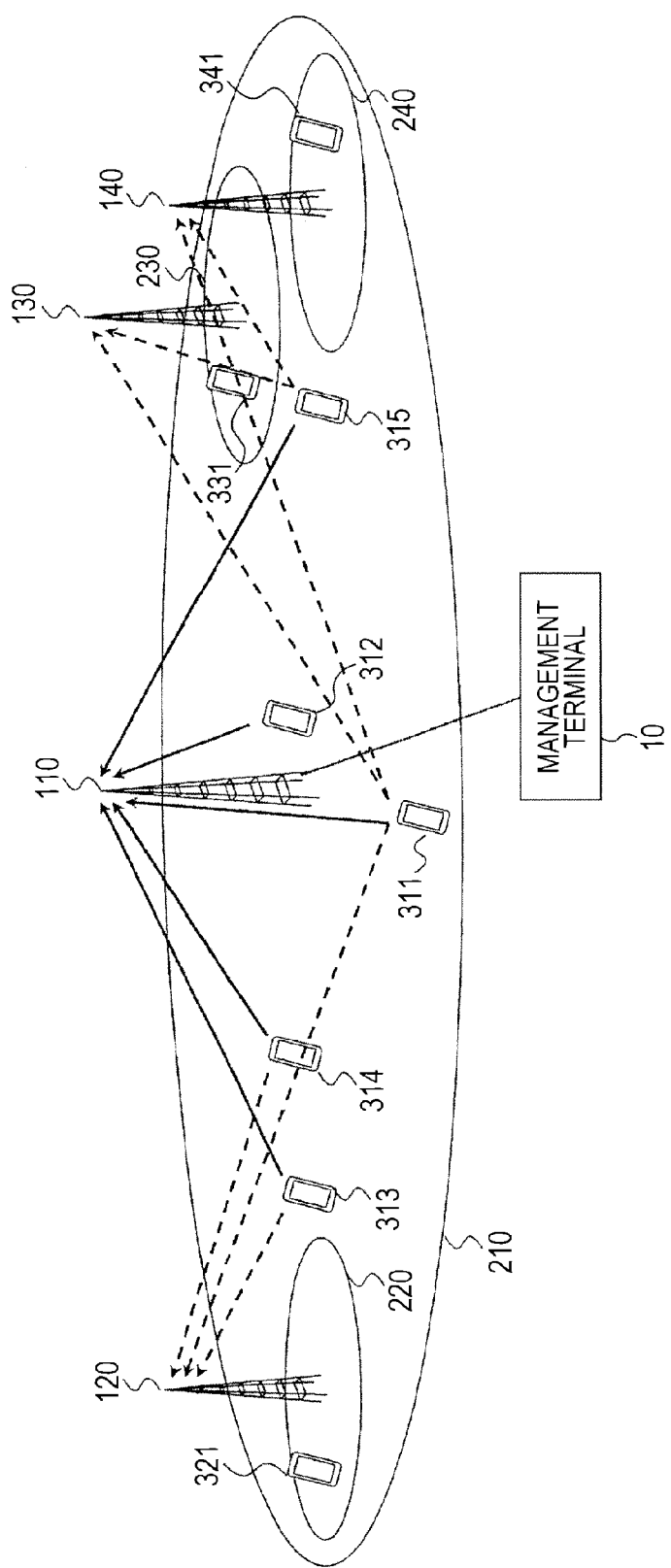
FIG. 2 is a view showing a configuration of a communication system according to configuration example 1.

FIG. 2 is a view showing a configuration of a wireless communication system according to configuration example 1.

The communication system includes a macro base station (first base station) 110, and pico base stations (second base stations) 120, 130, and 140. The present communication system may further include a management terminal 10.

The macro base station 110 configures a cell 210. The pico base stations 120, 130, and 140 respectively configure cells 220, 230, and 240. In the macro base station 110, an allowable arrival range (cell) of a downlink transmit power to a user equipment is comparatively large, and in the pico base station, an allowable arrival range of a downlink transmit power to a user equipment is comparatively small. User equipments 311 through 315 are connected to the macro base station 110 by wireless, a user terminal 321 is connected to the pico base station 120 by wireless, a user terminal 331 is connected to the pico base station 130 by wireless, and a user equipment 341 is connected to the pico base station 140 by wireless. FIG. 2 shows a behavior of an uplink communication in the macro base station 110. The user terminals 311 through 315 transmit radio waves to the macro base station 410 which is a connection destination, and at the same time, affect interferences with the neighbor pico base stations 120, 130, and 140. According to the example of FIG. 2, the user terminal 312 is disposed at a position near to the macro base station, and therefore, a transmit power thereof in the uplink communication is small, and an interference thereof affecting the neighbor pico base stations is inconsiderable. However, the other user terminals are disposed at a position far from the macro base station, and therefore, transmit powers thereof in the uplink communication are large, and interferences thereof affected to the neighbor pico base stations are considerable. The user terminals 313 and 314 affect considerable interferences with the pico base station 120. Similarly, the user terminal 315 affects considerable interferences with the pico base stations 130 and 140, and the user terminal 311 affects considerable interferences with the pico base stations 120, 130, and 140. Under the situation, the user terminals 321, 331 and 341 which are connected to the pico base stations, 120, 130, and 140 are difficult to acquire excellent uplink communication characteristics by influences of the interferences.

Figure 3:
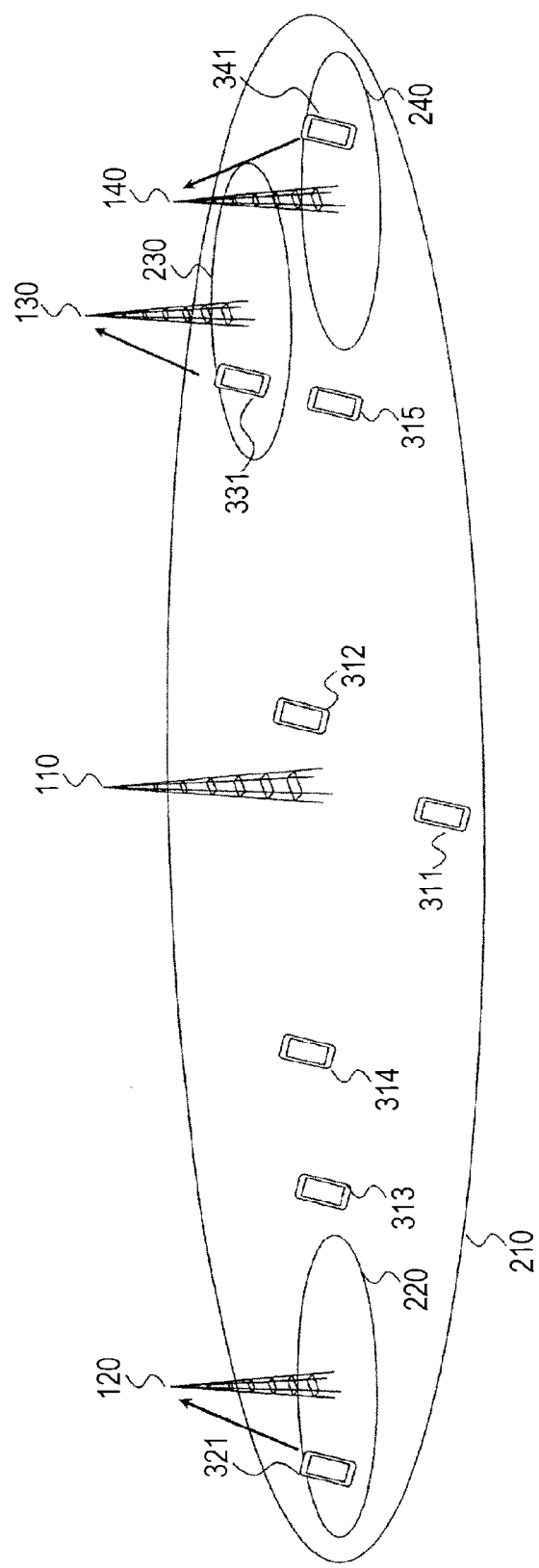
FIG. 3 is another view showing a configuration of a communication system according to configuration example 1.

FIG. 3 is another view showing a configuration of a wireless communication system according to configuration example 1. Constituent elements thereof stay the same as those of FIG. 2.

FIG. 3 shows a behavior of prohibiting uplink communications of the user terminals 311 through 315 connected to the macro base station. In this case, there are not the interferences with the neighbor pico base stations 120, 130, and 140. Therefore, the user equipments 321, 331, and 341 which are connected to the pico base stations 120, 130, and 140 can acquire excellent uplink communication characteristics. Therefore, even the pico base station can realize an excellent communication characteristic by carrying out communications while switching a state of FIG. 2 and a state of FIG. 3.

Figure 1:
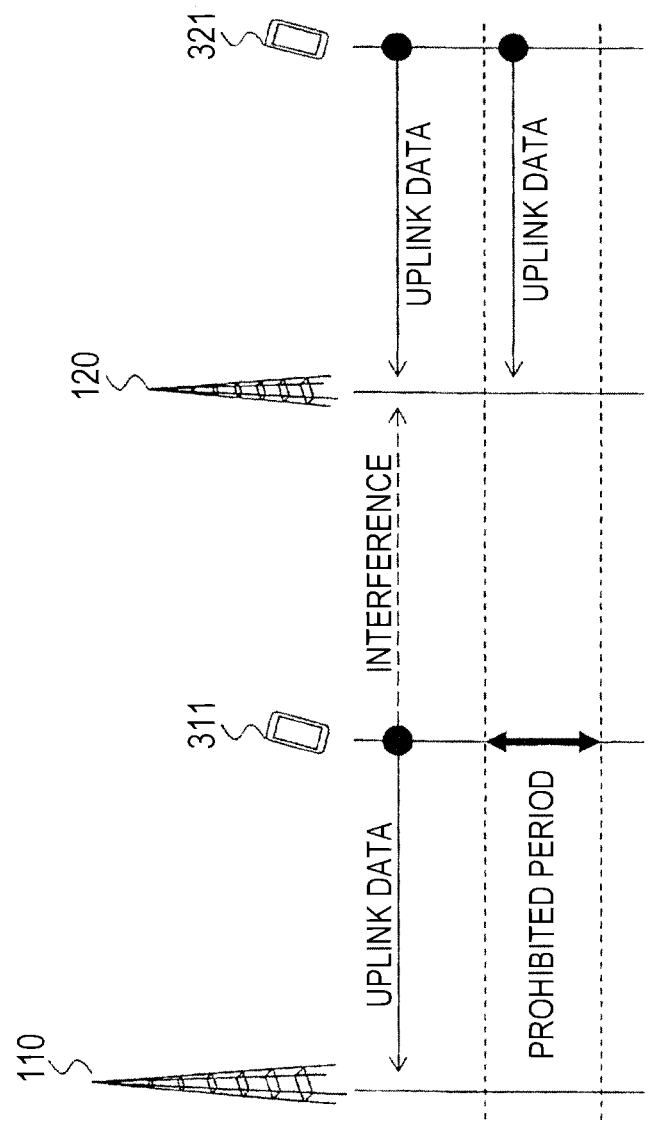
FIG. 1 is a diagram showing a communication prohibited period of a communication system according to configuration example 1.

FIG. 1 is a diagram showing a communication prohibited period of the wireless communication system according to configuration example 1.

In FIG. 1, only the macro base station 110, the pico base station 120, and the user equipments 311 and 321 are shown in order to make the explanation easy to understand. The user equipment 311 is connected to the macro base station 110, and the user equipment 321 is connected to the pico base station 120. The uplink communication from the user equipment 311 to the macro base station 110 affects a considerable interference with the pico base station 120. According to the configuration example, the macro base station 110 sets the uplink communication prohibited period (prohibited period in FIG. 1) to a user equipment connected to the macro base station 110 per se and instructs the user equipment to prohibit the uplink communication during the period. Thereby, during the uplink communication prohibited period of the macro base station 110, an excellent uplink communication characteristic can be acquired between the user equipment 321 and the pico base station 120. FIG. 3 corresponds to the uplink communication prohibited period of the macro base station 110, and FIG. 2 corresponds to the other period. That is, according to the configuration example, the uplink communication characteristic of the pico base station is improved by alternately carrying out FIG. 2 and FIG. 3.

Incidentally, although according to the present configuration example, only a situation of the uplink communication is shown, actually, a downlink communication is also carried out. The same goes with other configuration examples explained below.

2. Second Embodiment (Configuration Example 2)

Figure 4:
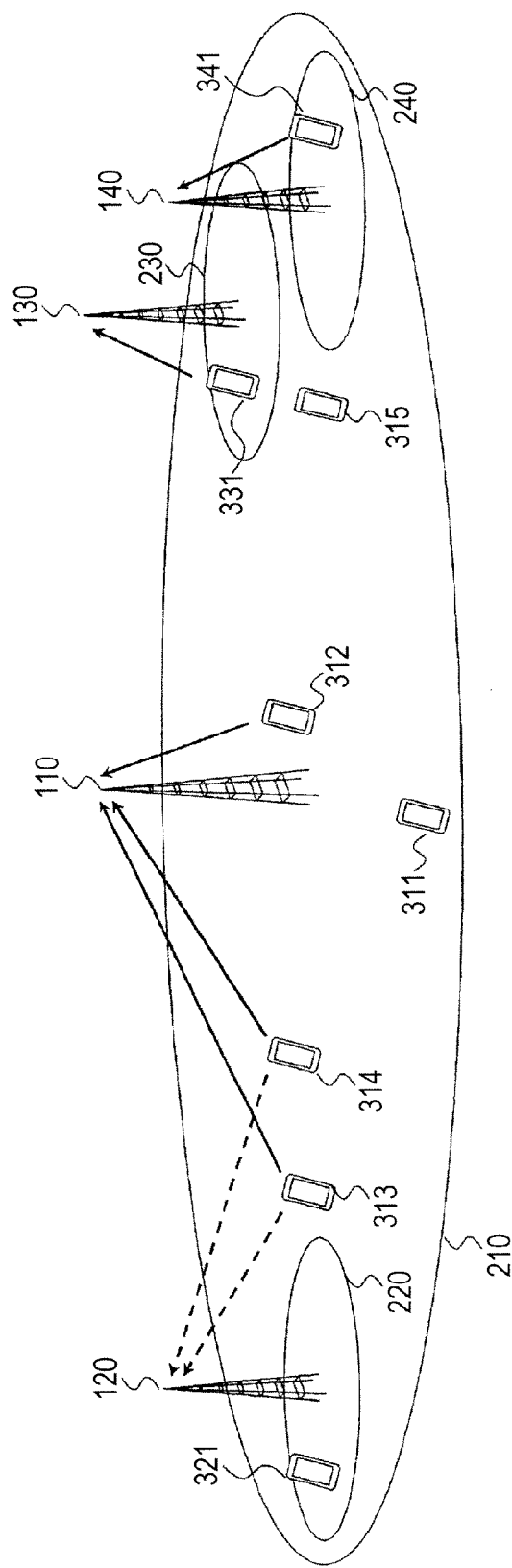
FIG. 4 is a view showing a configuration of a communication system according to configuration example 2.
Figure 5:
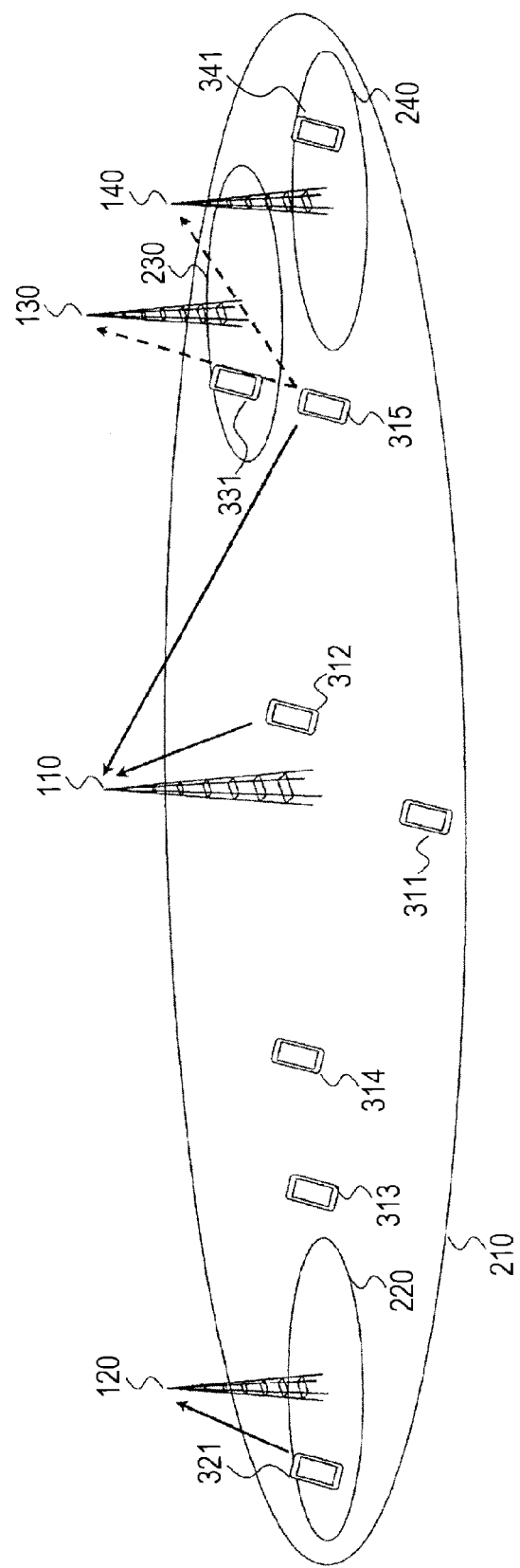
FIG. 5 is a view showing a configuration of a communication system according to configuration example 2.

FIG. 4 and FIG. 5 are views showing a configuration of a communication system according to configuration example 2. Constituent elements stay the same as those of FIG. 2.

According to configuration example 1, all of uplink communications of the macro base station 110 are prohibited during the uplink communication prohibited period. An uplink communication system throughput of the macro base station 110 is therefore reduced. The problem is addressed in the present configuration example.

According to the present configuration example, the macro base station 110 divides the user equipments 311 through 315 which are connected to the macro base station 110 per se, and neighbor base stations (here, pico base stations 120, 130, and 140) which are present in the neighborhood of the macro base station 110 into plural groups. In this example, as shown in FIG. 6, the macro base station 110 configures group A by the pico base station 120, and the user equipments 311, 313, and 314, and configures group B by the pico base stations 130 and 140 and the user equipments 311 and 315. Here, the macro base station 110 sets the user equipments 311, 313, and 314 which affect interferences that are larger than a previously determined criterion (for example, threshold) with the pico base station 120 that belongs to group A to belong to the same group A, and sets the user terminals 311 and 315 which affect interferences larger than a previously determined criterion (for example, threshold) to the pico base stations 130 and 140 that belong to group B to belong to the same group B. The macro base station 110 sets separate uplink communication prohibited periods to group A and group B. FIG. 4 shows a situation of an uplink communication during the uplink communication prohibited period that is set to group B. During the uplink communication prohibited period of group B, there are prohibited the uplink communications of the user equipments 311 and 315 which affect interferences to the pico base stations 130 and 140 that belong to group B to the macro base station 110, and therefore, no interference is affected to the pico base stations 130 and 140. Therefore, the pico base stations 130 and 140 can acquire excellent communication characteristics respectively between the pico base stations 130 and 140 and the user equipments 331 and 341. FIG. 5 shows a situation of an uplink communication during the uplink communication prohibited period that is set to group A. During the uplink communication prohibited period of group A, there are prohibited uplink communications of the user terminals 311, 313, and 314 which affect considerable interferences with the pico base station 120 that belongs to group A, and therefore, no interference is affected to the pico base station 120. Therefore, the pico base station 120 can acquire an excellent uplink communication characteristic between the pico base station 120 and the user equipment 321.

Figure 7:
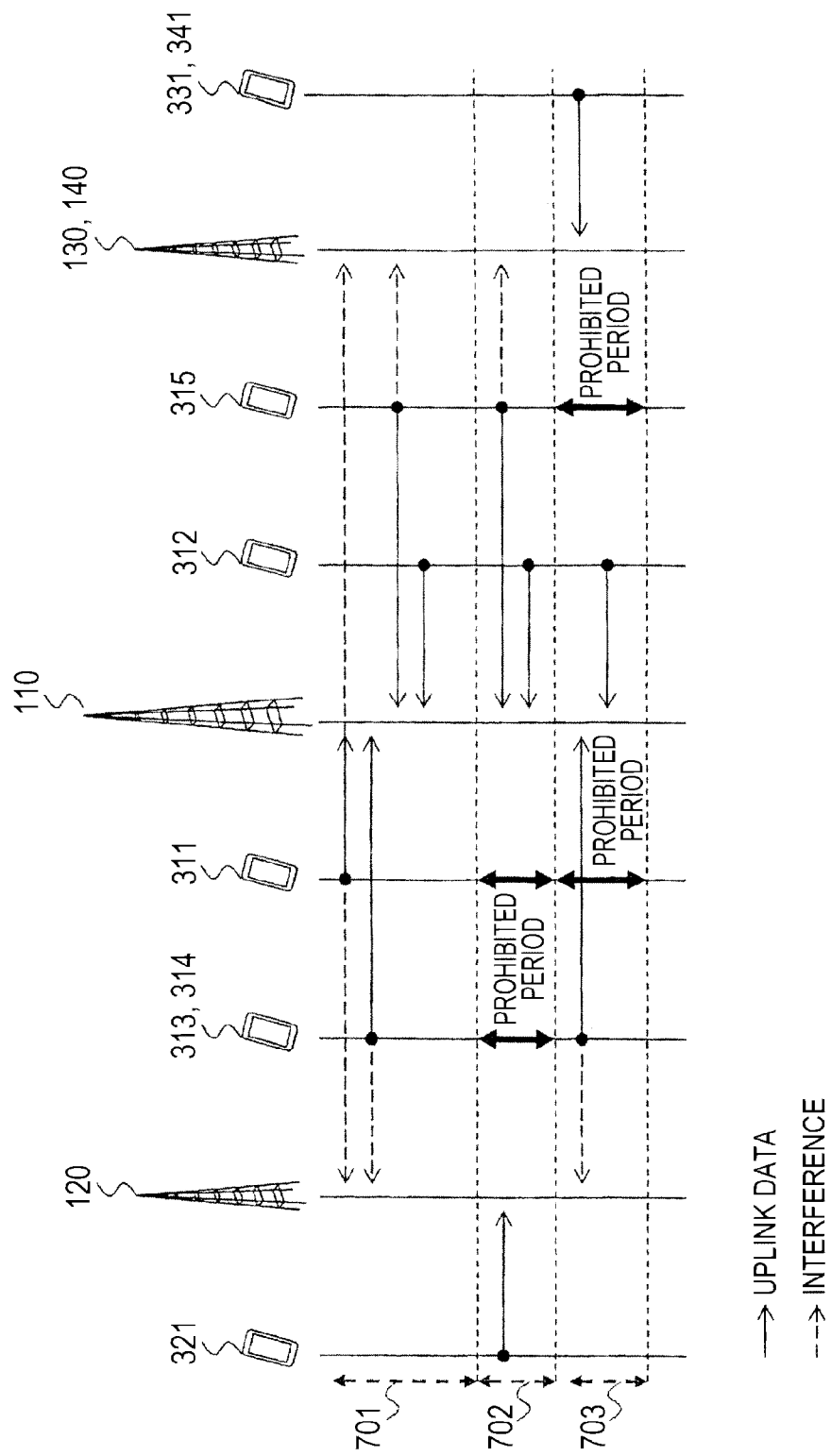
FIG. 7 is a diagram showing a communication prohibited period of the communication system according to configuration example 2.

FIG. 7 is a diagram showing a communication prohibited period of a communication system according to configuration example 2.

The base stations 110, 120, 130, and 140 and the user equipments 311 through 315, 321, 331, and 341 of FIG. 7 show the base stations and the user equipments of numbers the same as those of FIGS. 2 through 5. During a first period 701, the user equipments 311 through 315 execute uplink communications to the macro base station 110, and affect interferences to the pico base stations 120, 130, and 140. Therefore, during the period, there are brought about deteriorated uplink communication characteristics at the pico base stations 120, 130, and 140. During next period 702, uplink communication prohibited periods are set to the user equipments 311, 313, and 314 of group A. This corresponds to FIG. 5. Interferences with the pico base station 120 are reduced, and therefore, there is improved an uplink communication environment from the user terminal 321 to the pico base station 120. Here, there are not prohibited uplink communications of the user equipments 312 and 315 which do not affect considerable interferences with the pico base station 120, and the macro base station 110 continues receiving the uplink communications therefrom. During further next period 703, uplink communication prohibited periods are set to the user equipments 311 and 315 of group B. This corresponds to FIG. 4. Interferences with the pico base stations 130 and 140 are reduced. Therefore, there are improved communication environments of uplink communications from the user equipment 331 to the pico base station 130, and from the user equipment 341 to the pico base station 140. Here, there are not prohibited uplink communications of the user terminals 312, 313, and 314 which do not affect considerable interferences with the pico base stations 130 and 140, and the macro base station 110 continues receiving the uplink communications therefrom.

According to the present configuration example, the uplink communication of the macro base station 110 is not completely prohibited. Therefore, there can be restrained a reduction in the uplink communication system throughput of the macro base station 110 which is brought about in configuration example 1.

Incidentally, according to the present configuration example, there may be present a user equipment which belongs to plural groups as in the user equipment 311. Plural neighbor base stations may belong to the same group as in the pico base stations 130 and 140 which belong to group B. There may be present the user equipment which does not belong to any group as in the user equipment 312.

(Configuration Example 3)

FIG. 8 is an explanatory diagram of a group dividing method of configuration example 3.

FIG. 8 shows an example in which the macro base station 110 acquires to tabulate information of interference powers which respective user equipments affect with the pico base stations. For example, the macro base station 110 can store information of interference powers shown in FIG. 8 to a pertinent storage region. Here, assume that −90 dBm is set as a threshold of grouping. Also, assume that the pico base station 120 is previously set to group A, and the pico base stations 130 and 140 are previously set to group B. The user terminal 311 affects interference powers exceeding the threshold to the pico base stations 120 and 140. Therefore, the macro base station 110 allocates the user equipment 311 to both of group A to which the pico base station 120 belongs and group B to which the pico base station 140 belongs. The user terminal 312 does not affect interferences exceeding the threshold to neighbor base stations, and therefore, the macro base station 110 does not allocate the user equipment 312 to any group. The user equipments 313 and 314 affect interference powers equal to or more than the threshold to the pico base station 120, and therefore, the macro base station 140 allocates the user terminals 313 and 314 to group A to which the pico base station belongs. The user equipment 315 affects interference powers equal to or more than the threshold to the pico base stations 130 and 140, and therefore, the macro base station 110 allocates the user terminal 315 to group B to which the pico base stations 130 and 140 belong. The macro base station 110 can divide to group the user equipments which belong to the macro base station 110 per se as described above. A pico base station and a user equipment which affects considerable interference to the pico base station are made to belong to the same group. Therefore, when the uplink communication prohibited period is set to the group, there can be anticipated a reduction in an interference power which affects the pico base station that belongs to the group during the period.

In a case where a large number of pico base stations are installed within a cell of a macro base station, when one group is allocated to one piece of the pico base station, the number of groups becomes excessively large, and it is difficult to manage the groups. In that case, a certain number of groups may be put together to a single group again. For example, in a case where a single user equipment belongs to plural groups, the plural groups to which the user equipment belongs may be put together to a single group. Or, in a case where a number of groups become excessively large, setting of uplink communication prohibited periods can also be limited to portions of groups. In this case, when uplink communication prohibited periods are preferentially set in an order of larger numbers of user equipments that belong to groups, or in an order of larger total sums of interference powers from user equipments that belong to groups, the communication prohibited periods can be set in an order of groups having more considerable effect of reducing uplink communication interferences.

(Configuration Example 4)

Figure 9:
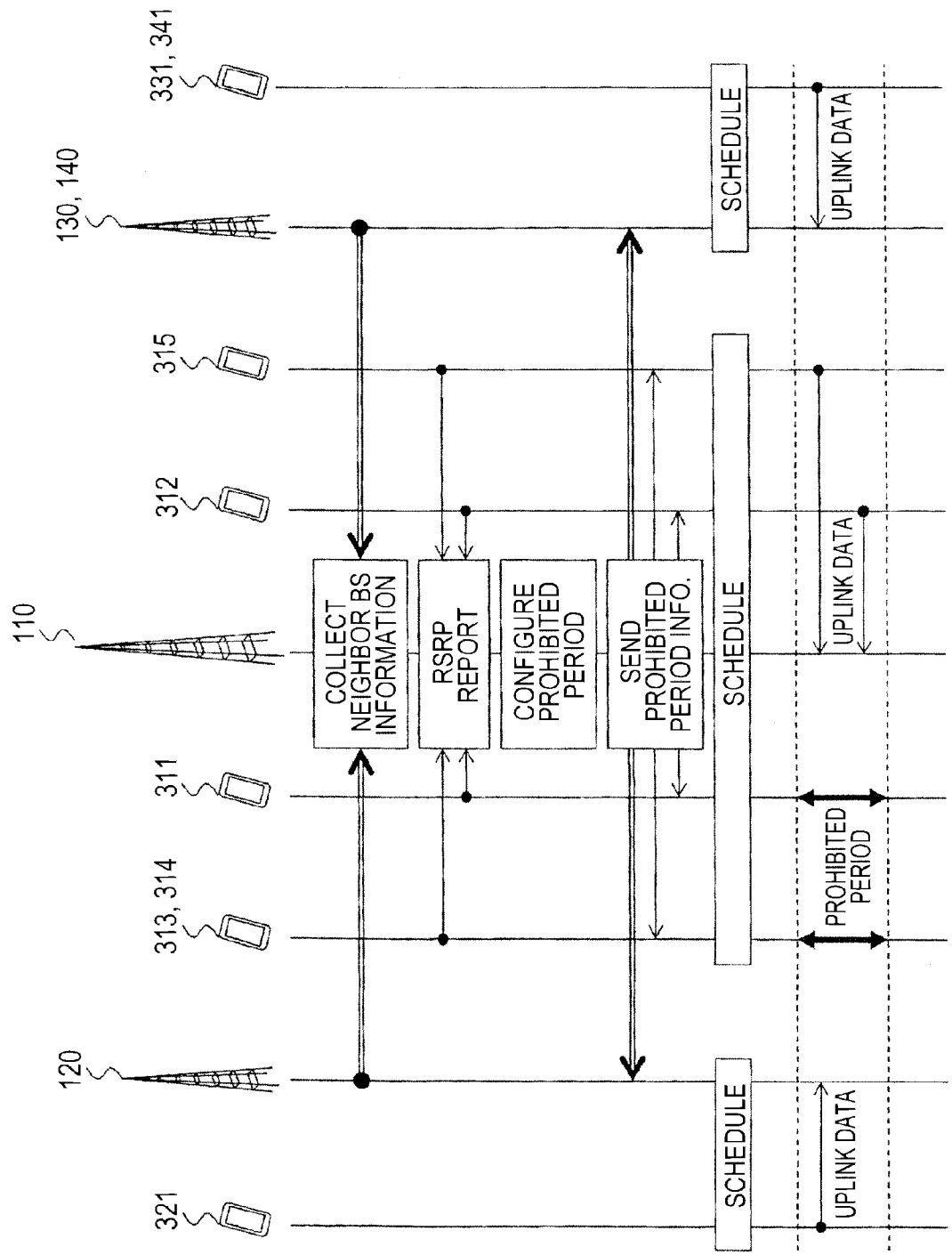
FIG. 9 is a diagram showing a flowchart of a wireless communication system according to configuration example 4.

FIG. 9 shows a flowchart of a wireless communication system of configuration example 4. Base stations and equipments in FIG. 9 stay the same as those of FIG. 7.

First, the macro base station 110 may acquire information from a neighbor base station. Here, the neighbor base station includes a base station in which, for example, a portion or a total of a radio wave arrival range (cell) overlaps the radio arrival range (cell) of the macro base station 110, and is, for example, the pico base station as shown in FIG. 2 and the like. When the macro base station 110 acquires an interference power which the equipment connected to the macro base station 110 affects to a neighbor base station, the interference power can be used in configuration example 3. Also, when the macro base station 110 acquires a magnitude of a transmission power of a neighbor base station, the magnitude can be used by apparatus or ways explained below. The neighbor base station measures a reception power (interference power) from the user equipment connected to the macro base station 110, and informs the measured reception power and/or a transmission power of the base station per se to the macro base station 120.

Next, the macro base station 110 receives information of a reception power of a radio wave arrived from the neighbor base station (also referred to as RSRP). When RSRP is large, it can be determined that a distance to the neighbor base station is short, and considerable interference is affected with the neighbor base station. Therefore, the macro base station 110 can also configure a criterion of grouping not by an interference power affected to a neighbor base station but a magnitude of RSRP in configuration example 3. Or, in a case where transmission powers of respective neighbor base stations are not equal to each other, the macro base station 110 can also execute grouping of configuration example 3 by calculating a propagation loss by comparing a magnitude of a transmission power of each neighbor base station that is already acquired and RSRP and configuring a criterion by a magnitude of the propagation loss. When the macro base station 110 knows a transmission power of a user equipment, the macro base station 110 can execute grouping of configuration example 3 by calculating an affected interference power in addition to the propagation loss.

The macro base station 110 groups a user equipment and a neighbor base station, and sets an uplink communication prohibited period for each group as shown in configuration example 3.

The macro base station 110 may inform information of the set uplink communication prohibited period to a user equipment or a neighbor base station. For example, in wireless LAN, a user equipment spontaneously starts an uplink communication unless the base station informs prohibition of an uplink communication to the user equipment. Therefore, according to such a wireless communication system, it is necessary that the macro base station 110 informs the uplink communication prohibited period explicitly to the user equipment. When the macro base station 110 informs the uplink communication prohibited period to the neighbor base station, the neighbor base station can know a period of improving an uplink communication characteristic, and the neighbor base station can schedule to execute high speed communication by using the period.

Thereafter, the macro base station 110 actually executes an uplink communication by scheduling the uplink communication such that the uplink communication of each group is prohibited during the set uplink communication prohibited period.

When scheduling is carried out in consideration of the set uplink communication prohibited period, the uplink communication can be prohibited during the uplink communication prohibited period even when the uplink communication prohibited period is not explicitly informed to the equipment. The uplink communication prohibited period can be informed to the equipment implicitly by informing a scheduled period of executing an uplink communication to the equipment.

(Configuration Example 5)

Figure 12:
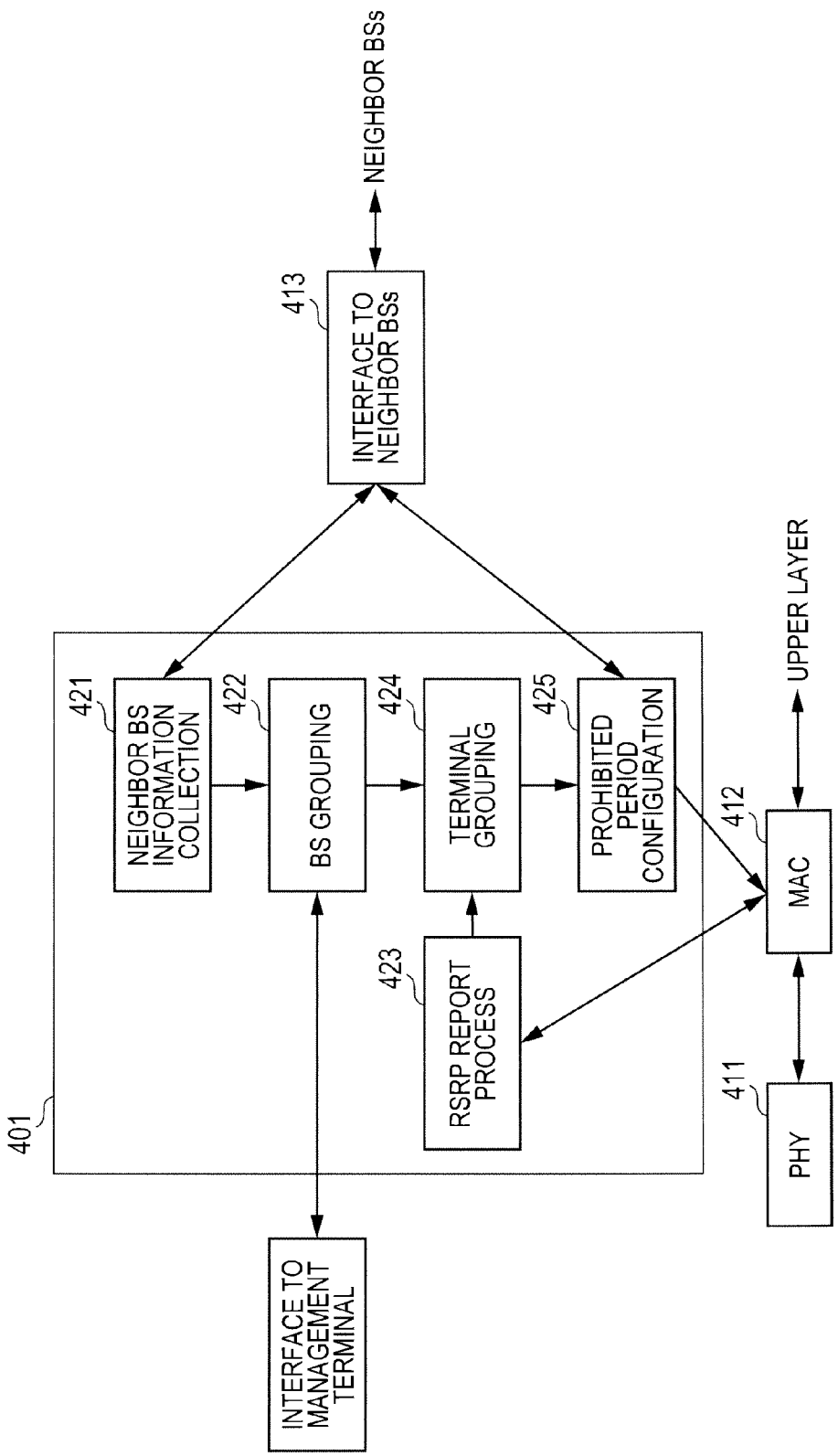
FIG. 12 is a diagram showing a configuration of a base station according to configuration example 5.

FIG. 12 is a diagram showing a configuration of a macro base station according to configuration example 5.

The macro base station 110 includes a block (signal processing unit) 401 of executing a signal processing according to the present embodiment, a PRY layer processing unit 411, a MAC layer processing unit 412, and a communication interference (second interface) 413 with a neighbor base station. The block 401 may include a neighbor base station information collecting unit 421, a base station grouping unit 422, an RSRP report processing unit 423, a terminal grouping unit 424, and a prohibited period setting unit (communication prohibited period setting unit) 425. Also, there may be included a communication interface (first interface) 414 with the management terminal 10. The macro base station 110 may include a pertinent storage unit of storing data processed at the respective units of the block 401. For example, there are stored group information of equipments, various kinds of thresholds (threshold table described later) and the like. Although here, there are shown only constituent elements necessary for explaining configuration examples of the present embodiment, a pertinent configuration of the base station can further be included.

The PHY layer processing unit 411 includes an error-correction encoder unit, a modulator and the like, and transmits a digital data inputted from the MAC layer processing unit 412 from an antenna to the equipment. The PHY layer processing unit 411 also includes an error-correction decoder and a demodulator, and converts a signal inputted from the antenna (signal from the equipment) into a digital data and outputs the digital data to the MAC layer processing unit 412. The MAC layer processing unit 412 includes a scheduling function, subjects a data inputted from an upper layer to a control processing of scheduling or the like to output to the PHY layer processing unit 411. The MAC layer processing unit 412 restores scheduling information for a data inputted from the PHY layer processing unit 411 and outputs the data to the upper layer.

An explanation will be given of an operation of the block 401 which executes a signal processing of the present embodiment as follows. The macro base station 110 may acquire information from a neighbor base station as described in configuration example 4. For example, the macro base station 110 acquires an interference power of a neighbor base station from an equipment connected to the macro base station 110. In a case where the macro base station acquires information from a neighbor base station, the neighbor base station information collecting unit 421 communicates with the neighbor base station via the communication interface 413 with the neighbor base station, and acquires the information. Next, the macro base station 110 groups a pico base station by the base station grouping unit 422 based on, for example, the information collected by the neighbor base station information collecting unit 421. The grouping may be carried out by automatic setting or manual setting. For example, in a case where the macro base station can acquire position information of the pico base station, the automatic setting of grouping can be carried out by previously setting a distance which configures a threshold, and configuring the same group in a case where the distance to the pico base station is less than the threshold. Also, manual setting of grouping the pico base station can be carried out by inputting the position information from an equipment for operation, or setting a setting file to the macro base station 110.

Next, the macro base station 110 receives information of RSRP from the neighbor base station by way of a user equipment connected to the macro base station 110 per se. At this occasion, the RSRP report processing unit 423 requests the RSRP information to the MAC layer processing unit 412. Then, the MAC layer processing unit 412 generates a report request of the RSRP information for the user equipment connected to the MAC layer processing unit per se, and informs the report request to the user equipment by way of the PHY layer processing unit 411. In correspondence therewith, the user equipment returns the RSRP information, the macro base station transmits the returned information to the RSRP report processing unit 423 via the PHY layer processing unit 411 and the MAC layer processing unit 412. The RSRP report processing unit 423 outputs the collected RSRP information to the terminal grouping unit 424, and the terminal grouping unit 424 groups the equipment by using the RSRP information. The terminal grouping unit 424 outputs a result of grouping to the prohibited time setting unit 425, and the prohibited time setting unit 425 sets communication prohibited periods of respective groups. For example, the prohibited period setting unit 425 shifts to set the communication prohibited periods for respective groups. The communication prohibited periods set by the prohibited period setting unit 425 are transmitted to the MAC layer processing unit 412, and the MAC layer processing unit 412 controls communications of the respective user equipments based on the transmitted communication period setting. Here, the macro base station 110 may inform the information of the communication prohibited period set by the prohibited period setting unit 425 to the neighbor base station by way of the communication interface 413 with the neighbor base station. Also, the macro base station 110 may inform the information to the user equipment by way of the MAC layer processing unit 412 and the PHY layer processing unit 411.

(Configuration Example 6)

Figure 13:
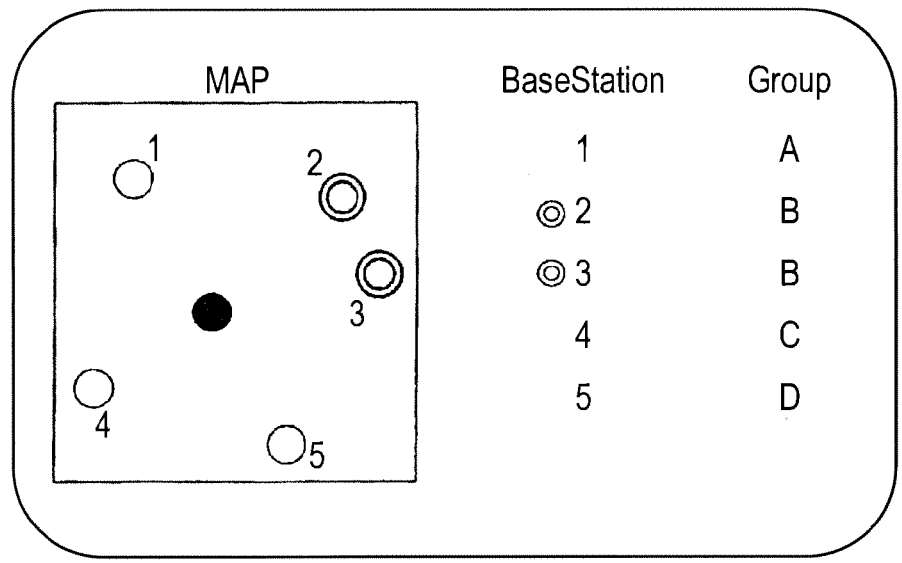
FIG. 13 shows an example of a base station group setting screen according to configuration example 6.

FIG. 13 shows an example of a base station group setting screen according to configuration example 6. FIG. 13 shows an example of a setting screen of the management terminal 10 in a case where a base station is grouped manually by the base station grouping unit 422 of FIG. 12 in configuration example 5. A left half of the screen displays a map, a black circle indicates a position of a macro base station which becomes a setting object, and the other circle indicates a position of a neighbor base station. A right half of the screen indicates a display of the base station grouping setting, and group ID's are made to be able to be set to neighbor base stations 1 through 5. Base stations to be of the same group may be displayed in the setting screen. In the example of FIG. 13, it is proposed to set the same group ID to the base stations 2 and 3 having an interval therebetween narrower than a previously set distance, and marks thereof on the map are configured by double circles. Also, in the grouping setting screen on the right side, it is proposed to set the same group ID's by attaching double circles contiguous to base station numbers. Although double circles are used for displaying the proposals, naturally, other sign or color can also be used. Incidentally, base station arrangement information of positions of respective base stations or the like can previously be set.

Figure 14:
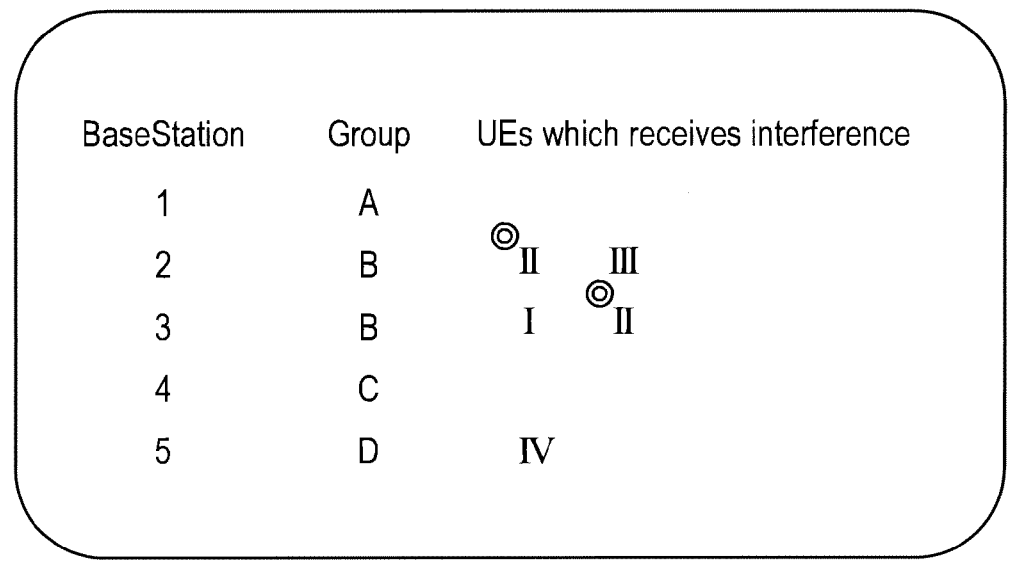
FIG. 14 shows another example of a base station group setting screen according to configuration example 6.

FIG. 14 shows other example of a base station group setting screen according to configuration example 6. Group ID's are made to be able to be set to neighbor base stations 1 through 5. Otherwise, there is to be displayed ID of a user equipment which receives an interference signal from a neighbor base station. For example, the user equipment which receives the interference signal may be configured by a user equipment in which a reception power of the neighbor base station is larger than a previously set power value. An ID of a user equipment which receives an interference signal from a neighbor base station is reference information when a group is set. For example, when there is present a user equipment which receives interference signals from plural neighbor base stations, the plural neighbor base stations are installed at positions near to each other, and it is pertinent to group the base stations. In FIG. 14, double circles are attached to a user equipment ID which receives interference signals from plural neighbor base stations to be able to be known easily. Naturally, the user terminal ID can also be displayed by using other signor color. The group setting screens of FIG. 13 and FIG. 14 are displayed on, for example, the management terminal 10. The macro base station 110 outputs information for displaying the screen to the management terminal 10 via the interface 414. The macro base station 110 inputs information inputted from the management terminal 10 via the interface 414.

3. Third Embodiment (Configuration Example 7)

FIG. 10 is a table used for setting a threshold according to configuration example 7.

According to configuration example 3 described above, the macro base station 110 acquires the information of the interference powers which the respective user equipments affect the respective pico base stations, and stores the information in a style as shown in, for example, FIG. 8, and grouping is carried out by comparing the interference powers with the threshold. It is controlled by the grouping such that an interference exceeding the threshold does not arrive at the pico base station from the user equipment. However, in a case where a number of user equipments connected to the macro base station 110 is large, even when the interference power which arrives from the single user equipment is small, interferences arrive from a large number of the user equipments. Therefore, a total interference power is increased, and the uplink communication characteristic of the pico base station can be deteriorated. Therefore, in a case where a number of equipments connected to the macro base station 110 is large, it is effective to reduce the threshold of the interference power that is used in grouping according to configuration example 3. There is prepared a threshold table (threshold storage region) as shown in FIG. 10 in order to realize the reduction. The equipment grouping unit 424 reads thresholds in correspondence with the number of user equipments connected to the macro base station 110 from the threshold table of FIG. 10, and carries out grouping of configuration example 3 by using the table. Although FIG. 10 shows a conversion table from a user equipment number to thresholds, there may be provided a conversion equation as in, for example, "Threshold=-2× (user equipment number)-80 dBm".

A deterioration in an uplink communication characteristic at the pico base station can be reduced by enabling to reduce an increase in a total interference power to a neighbor base station by increasing a user equipment number by changing the threshold by the user terminal number as in the present configuration example.

(Configuration Example 8)

FIG. 11 is a table used in setting a threshold of configuration example 8.

As has been explained in configuration example 7, the threshold of grouping in configuration example 3 can be changed by a number of equipments connected to the macro base station. As a method thereof, the threshold can also be changed by using time information other than direct reference to the equipment number. For example, a number of user equipments connected to the macro base station 110 differs by a.m. 9:00 through p.m. 9:00 and p.m. 9:00 through a.m. 9:00, and therefore, there is set a threshold which differs by a.m. and p.m. in FIG. 11. Otherwise, it is conceivable to be effective by changing a threshold by, for example, day of week, month, or season. In a table of FIG. 11, different thresholds are set by dividing one year to January through June and July through December.

Incidentally, the respective embodiments described above can be combined. For example, the configuration of the base station of the second embodiment can be used in, for example, the first embodiment and the third embodiment.

4. Application Examples

Finally, application examples of the present embodiments are as follows.

Application Example 1

According to the present wireless communication base station, for example, in a wireless communication system including a first base station having a relatively large allowable arrival range of a downlink transmission power to a user equipment, and a second base station having a relatively small allowable arrival range of the downlink transmission power to the user equipment and affected with an interference by an uplink communication of the first base station and the user equipment, a wireless communication base station used as the first base station:

includes a communication prohibited period setting unit of setting an uplink communication prohibited period to the user equipment belonging to the base station per se, and prohibits the uplink communication from the user equipment to the wireless communication base station per se in the uplink communication prohibited period.

According thereto, deterioration in a communication characteristic by the interference can be improved, and deterioration in a wireless communication characteristic brought about in the uplink communication can be improved.

Application Example 2

The wireless communication base station described in application example 1 further includes:

a grouping processing unit of dividing the user equipment belonging to the wireless communication base station per se into plural groups, and setting the uplink communication prohibited period to different time periods of the respective groups.

According thereto, a reduction in a throughput of the wireless communication base station caused by the communication prohibited period can be restrained.

Application Example 3

The wireless communication base station of application example 2 further includes:

an information collecting unit of collecting information indicating a magnitude of the interference affected to the respective second base stations by the uplink communication from the user equipment.

The grouping processing unit makes the user equipment in which the magnitude of the interference affected to the second base station exceeds a previously determined criterion belong to a group the same as a group of the second base station as one of features thereof.

Thereby, in the second base station, the interference by the uplink communication from the user equipment to the wireless communication base station is reduced.

Application Example 4

According to the wireless communication base station described in application example 3, the previously determined criterion is a threshold of an interference power, and the grouping processing unit makes a single or plural user equipment(s) in which the interference power affected to the second base station is larger than the threshold belong to a group the same as the group of the second base station based on the interference power affected with the respective second base stations by the uplink communication from the user equipment as one of features thereof.

Thereby, the equipments can be grouped based on the interference power.

Application Example 5

According to the wireless communication base station described in application example 4, at least one of the user equipments belongs to the plural groups as one of features thereof.

Thereby, in the user equipment affecting the interference with the plural second base stations, communications are prohibited in the respective communication prohibited periods in correspondence with the plural groups.

Application Example 6

According to the wireless communication base station described in application example 4, the plural second base stations belong to at least one of the groups. Thereby, the management of the groups can be prevented from being complicated by reducing a number of the groups.

Application Example 7

According to the wireless communication base station described in application example 6, the grouping processing unit makes the two second base stations having an interval therebetween narrower than a previously determined distance belong to the same group.

Thereby, the second base stations having the narrow interval are automatically made to belong to the same group, and uplink communications from the user equipments at vicinities of the base stations can simultaneously be prohibited.

Application Example 8

The wireless communication base station described in application example 6 further includes:

a first interface including information of arranging the second base station, displaying a group setting screen of highlighting the two second base stations having the interval narrower than the previously determined distance at a management terminal, and inputting group setting information inputted in accordance with the display.

Thereby, it can be supported that a manager manually groups the base stations.

Application Example 9

The wireless communication base station described in application example 6 further includes:

a first interface specifying the user equipment in which a magnitude of the interferences of the plural second base stations exceeds a previously determined magnitude, displaying a group setting screen displaying that the plural base stations are installed at positions near to each other at a management terminal, and inputting group setting information inputted in accordance with the display.

Thereby, it can be supported that a manager manually groups the base stations.

Application Example 10

According to the wireless communication base station described in application example 3, the grouping processing unit changes the criterion in accordance with a number of the user equipments connected to the wireless communication base station per se as one of features thereof.

Thereby, when the number of the user equipments is large, the number of equipments in the group is made to be large by lowering the criterion, and a total interference power affecting the base station can be controlled.

Application Example 11

According to the wireless communication base station described in application example 3, the grouping processing unit changes the criterion in accordance with time as one of features thereof.

Thereby, the number of the user equipments is changed by time. Therefore, when the number of the user equipments is large, the number of equipments in a group is made to be large by lowering the criterion, and the total interference power affected with the base station can be controlled.

Application Example 12

According to the wireless communication base station described in application example 1, the uplink communication prohibited period is informed to the user equipment as one of features thereof.

Thereby, the user equipment can recognize the uplink communication prohibited period.

Application Example 13

The wireless communication base station described in application example 1 further includes:

a second interface of informing the uplink communication prohibited period to the second base station which carries out scheduling of communication based on the uplink communication prohibited period as one of features thereof.

Thereby, the second base station can recognize the uplink communication prohibited period. Also, the second base station can concentratedly arrange the uplink communication to the base station per se during the uplink communication prohibited period from the equipment to the wireless communication base station.

Application Example 14

A wireless communication system including a first base station having a relatively large allowable arrival range of a downlink transmission power to a user equipment, and a second base station having a relatively small allowable arrival range of the downlink transmission power to the user equipment, and affected with an interference by an uplink communication of the first base station and the user equipment, in which the first base station includes:

a communication prohibited period setting unit of setting an uplink communication prohibited period to the user terminal belonging to the first base station per se, and prohibits the uplink communication from the user equipment to the wireless communication base station per se during the uplink communication prohibited period.

According thereto, deterioration in a communication characteristic by the interference can be improved, and deterioration in a wireless communication characteristic caused in the uplink communication can be improved.

Application Example 15

An uplink communication interference controlling method in a wireless communication system including a first base station having a relatively large allowable arrival range of a downlink transmission power to a user equipment, and a second base station having a relatively small allowable arrival range of the downlink transmission power to the user equipment, and affected with an interference by an uplink communication of the first base station and the user equipment, in which:

the first base station sets an uplink communication prohibited period to the user equipment belonging to the base station per se, and prohibits the uplink communication to the wireless communication base station per se from the user equipment during the uplink communication prohibited period.

According thereto, deterioration in a communication characteristic by the interference can be improved, and a deterioration in a wireless communication characteristic caused in the uplink communication can be improved.

The present invention can be used to a wireless communication system in which base stations having different downlink transmit powers are mixedly present as in, for example, HetNet.

What is claimed is:

1. A wireless communication base station used as a first base station in a wireless communication system including the first base station having a relatively large allowable arrival range of a downlink transmit power to a user equipment, and a second base station having a relatively small allowable arrival range of the downlink transmit power to a user terminal, and affected with an interference by an uplink communication of the first base station and the user terminal, the wireless communication base station comprising:

a communication prohibited period setting unit configured to set an uplink communication prohibited period to the user equipment belonging to the wireless communication base station per se, wherein the uplink communication from the user equipment to the wireless communication base station per se is prohibited during the uplink communication prohibited period;

a grouping processing unit configured to divide user terminals belonging to the wireless communication base station per se into a plurality of groups, and set an uplink communication time period to different time periods of the respective groups; and an information collecting unit configured to collect a piece of information indicating magnitudes of interferences affecting the second base station by the uplink communication from the user equipment, wherein the grouping processing unit is configured to make the user terminal in which the magnitude of the interferences affecting the second base station exceeds a previously determined criterion belong to a group the same as a group of the second base station.

2. The wireless communication base station according to claim 1, wherein:

the previously determined criterion is a threshold of interference power, and wherein the grouping processing unit is configured to make a single terminal or a plurality of user terminals in which interference power affecting the second base station is larger than the threshold belong to a group the same as the group of the second base station based on the interference power affecting the respective base stations by the uplink communication from the user equipment.

3. The wireless communication base station according to claim 1, wherein at least one piece of the user equipment belongs to the plurality of groups.

4. The wireless communication base station according to claim 1, wherein a plurality of second base stations belong to at least one of the groups.

5. The wireless communication base station according to claim 4, wherein the grouping processing unit is configured to make the two second base stations having an interval therebetween narrower than a previously determined distance belong to the same group.

6. The wireless communication base station according to claim 4, further comprising: a first interface specifying the user equipment in which the magnitudes of the interferences of the plurality of second base stations exceed a previously determined magnitude, displaying a group setting screen of displaying that a plurality of base stations are installed at positions near to each other at a management terminal, and inputting a piece of group setting information inputted in accordance with the display.

7. The wireless communication base station according to claim 4, further comprising: a first interface including a piece for information of arranging the second base station, displaying a group setting screen highlighting the two second base stations having an interval therebetween narrower than the previously determined distance at a management terminal, and inputting a piece of group setting information inputted in accordance with the display.

8. The wireless communication base station according to claim 1, wherein the grouping processing unit is configured to change the criterion in accordance with a number of the user equipments connected to the wireless communication base station per se.

9. The wireless communication base station according to claim 1, wherein the grouping processing unit is configured to change the criterion in accordance with time.

10. The wireless communication base station according to claim 1, wherein the uplink communication prohibited period is informed to the user equipment.

11. The wireless communication base station according to claim 1, further comprising: a second interface for informing the uplink communication prohibited period to the second base station which executes scheduling of a communication based on the uplink communication prohibited period.

12. A wireless communication system comprising:
a first base station having a relatively large allowable arrival range of a downlink transmission power to a user equipment, and a second base station having a relatively small allowable arrival range of the downlink transmission power to the user equipment, and affected with an interference by an uplink communication of the first base station and the user equipment,
a grouping processing unit configured to divide user terminals belonging to the first base station per se into a plurality of groups, and set an uplink communication time period to different time periods of the respective groups, and
an information collecting unit configured to collect a piece of information indicating magnitudes of interferences affecting the second base station by the uplink communication from the user equipment, wherein the grouping processing unit is configured to make the user terminal in which a magnitude of an interference affecting the second base station exceeds a previously determined criterion belong to a group the same as a group of the second base station,
wherein the first base station includes: a communication prohibited period setting unit configured to set an uplink communication prohibited period to the user equipment belonging to the first base station per se,
wherein the uplink communication from the user equipment to the first base station per se is prohibited during the uplink communication prohibited period.

13. An uplink communication interference controlling method in a wireless communication system comprising a first base station having a relatively large allowable arrival range of a downlink transmission power to a user equipment, and a second base station having a relatively small allowable arrival range of the downlink transmission power to the user equipment, and affected with an interference by an uplink communication of the first base station and the user equipment, the uplink communication interference controlling method comprising:
dividing user terminals belonging to the first base station per se into a plurality of groups;
setting an uplink communication time period to different time periods of the respective groups;
collecting a piece of information indicating magnitudes of interferences affecting the second base station by the uplink communication from the user equipment; and
making the user terminal in which a magnitude of an interference affecting the second base station exceeds a previously determined criterion belong to a group the same as a group of the second base station,
wherein the first base station sets an uplink communication prohibited period to the user equipment belonging to the first base station per se, and
wherein the uplink communication from the user equipment to the first base station per se is prohibited during the uplink communication prohibited period.

* * * * *